United States Patent
Cheng et al.

(10) Patent No.: US 9,017,024 B2
(45) Date of Patent: Apr. 28, 2015

(54) CHORDWIDTH RESTORATION OF A TRAILING EDGE OF A TURBINE AIRFOIL BY LASER CLAD

(75) Inventors: Kenny Cheng, Singapore (SG); Kin Keong Thomas Jek, Singapore (SG); Yoke Min Cheong, Singapore (SG)

(73) Assignee: United Technologies Corporation, Hartford, CT (US)

( * ) Notice: Subject to any disclaimer, the term of this patent is extended or adjusted under 35 U.S.C. 154(b) by 1680 days.

(21) Appl. No.: 11/388,084

(22) Filed: Mar. 23, 2006

(65) Prior Publication Data

US 2007/0163113 A1 Jul. 19, 2007

(51) Int. Cl.
  *B23K 9/04* (2006.01)
  *F01D 5/00* (2006.01)
  *B23P 6/00* (2006.01)
  *B23K 26/32* (2014.01)
  *B23K 26/34* (2014.01)

(52) U.S. Cl.
  CPC ........... *F01D 5/005* (2013.01); *Y10T 29/49318* (2015.01); *B23K 2201/001* (2013.01); *B23P 6/007* (2013.01); *Y02T 50/671* (2013.01); *Y02T 50/673* (2013.01); *B23K 26/3213* (2013.01); *B23K 26/345* (2013.01)

(58) Field of Classification Search
  USPC .................. 416/1, 213 R; 29/402.16, 402.18, 29/402.19, 889.1, 889.72
  See application file for complete search history.

(56) References Cited

U.S. PATENT DOCUMENTS

| | | | |
|---|---|---|---|
| 4,394,879 A * | 7/1983 | Reynolds | 164/76.1 |
| 5,142,778 A | 9/1992 | Smolinski | |
| 6,154,959 A * | 12/2000 | Goodwater et al. | 29/889.1 |
| 6,173,491 B1 * | 1/2001 | Goodwater et al. | 29/889.1 |
| 6,269,540 B1 * | 8/2001 | Islam et al. | 29/889.7 |
| 6,742,698 B2 * | 6/2004 | Shah et al. | 228/119 |
| 6,972,390 B2 * | 12/2005 | Hu et al. | 219/121.64 |
| 7,009,137 B2 * | 3/2006 | Guo | 219/121.64 |
| 7,316,850 B2 * | 1/2008 | Hu et al. | 428/637 |
| 2002/0142107 A1 * | 10/2002 | Mazumder et al. | 427/596 |
| 2004/0191064 A1 * | 9/2004 | Guo | 416/191 |
| 2005/0015980 A1 | 1/2005 | Kottilingam et al. | |

(Continued)

FOREIGN PATENT DOCUMENTS

| | | |
|---|---|---|
| EP | 1371439 | 12/2003 |
| EP | 1584702 | 10/2005 |

(Continued)

OTHER PUBLICATIONS

Extended European Search Report for EP07250144.8 mailed on Apr. 21, 2010.

*Primary Examiner* — Edward Look
*Assistant Examiner* — Aaron R Eastman
(74) *Attorney, Agent, or Firm* — Carlson, Gaskey & Olds, P.C.

(57) ABSTRACT

A method of restoring a gas turbine engine component includes repairing a turbine airfoil along a chordwidth dimension to rebuild a trailing edge of the turbine airfoil to near original dimensions. An eroded portion of the trailing edge of the turbine airfoil is removed and a filler material is deposited onto the trailing edge to produce a laser cladding. During the laser cladding process, a barrier member is inserted into a slot that extends through the trailing edge to prevent filler material from entering the slot and to act as a heat sink to remove heat from the trailing edge during the laser cladding process.

16 Claims, 2 Drawing Sheets

(56) References Cited

U.S. PATENT DOCUMENTS

| | | |
|---|---|---|
| 2005/0029235 A1 | 2/2005 | Mielke |
| 2005/0061858 A1 | 3/2005 | Ditzel et al. |
| 2005/0178750 A1* | 8/2005 | Cheng et al. ............ 219/121.64 |
| 2005/0194363 A1* | 9/2005 | Hu et al. .................. 219/121.64 |
| 2005/0217110 A1* | 10/2005 | Topal ........................... 29/889.1 |
| 2006/0067830 A1* | 3/2006 | Guo et al. ................. 416/229 R |
| 2006/0090336 A1* | 5/2006 | Graham et al. .............. 29/889.1 |
| 2006/0248718 A1* | 11/2006 | Szela et al. .................. 29/889.1 |
| 2006/0248719 A1* | 11/2006 | Szela et al. .................. 29/889.7 |
| 2007/0044306 A1* | 3/2007 | Szela et al. .................. 29/889.1 |
| 2007/0163115 A1* | 7/2007 | Cheng et al. ................ 29/889.2 |

FOREIGN PATENT DOCUMENTS

| | | | |
|---|---|---|---|
| EP | 1721697 A1 | 11/2006 | |
| EP | 1808262 A1 * | 7/2007 | ............. B23K 26/34 |

\* cited by examiner

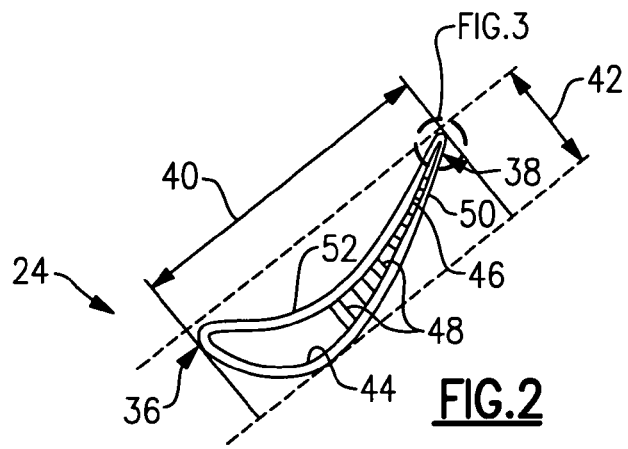
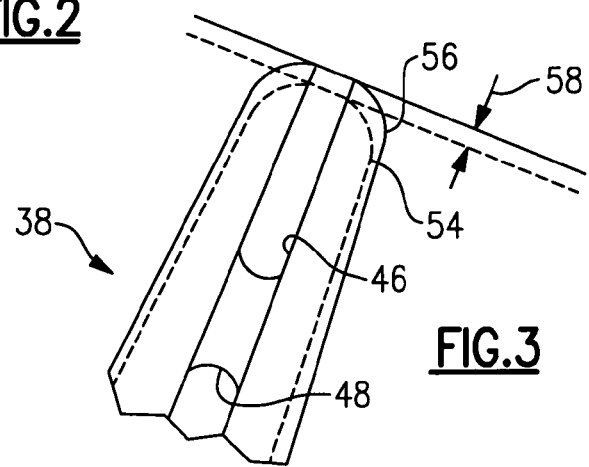
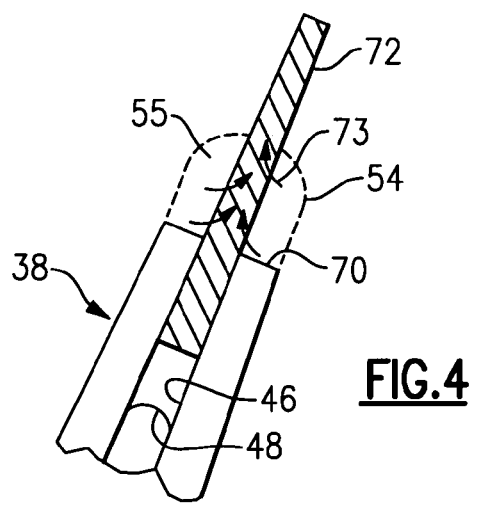
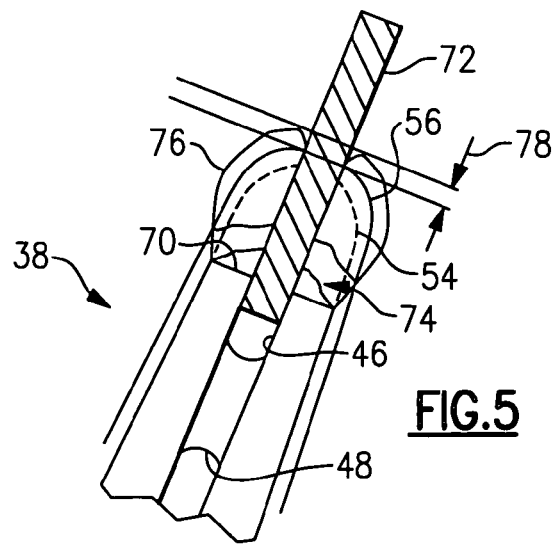

CHORDWIDTH RESTORATION OF A TRAILING EDGE OF A TURBINE AIRFOIL BY LASER CLAD

RELATED APPLICATIONS

This application claims priority to Singapore application No. 200600245-5, filed Jan. 16, 2006.

BACKGROUND OF THE INVENTION

This invention relates to repair of gas turbine engine components and, more particularly, to a method for restoring a chordwidth dimension of a turbine airfoil.

Conventional gas turbine engines typically include turbine sections having an alternating arrangement of rotating turbine blades and static turbine vanes. A flow of hot gases from a combustor section expands against the turbine blades and vanes to rotationally drive the turbine blades, which are coupled to an engine main shaft that drives a compressor section.

During engine operation, the hot gases produce a corrosive environment that corrosively attacks the surfaces of the blades and vanes and often results in corrosive pitting. The hot gases, soot from combustion, and particles within the flow of hot gases, also wear against the turbine blades and vanes and erode the surfaces of the blades, vanes, and other turbine engine components, which often changes the originally designed dimensions of the turbine engine components. The turbine vanes, for example, are formed in the shape of an airfoil and include a leading edge and a trailing edge that define a chordwidth there between. An aspect radio between the chordwidth and a thickness of the airfoil determines the aerodynamic efficiency of the turbine vane. Disadvantageously, the trailing edge of the turbine vane is susceptible to wear and erosion during turbine engine operation. As the trailing edge erodes, the length of the chordwidth dimension of the turbine vane decreases. Thus, the aspect ratio between the chordwidth and the airfoil thickness decreases, thereby decreasing the aerodynamic efficiency of the turbine vane.

Conventional engine component repair techniques have been used to repair component microcracks, from fatigue for example, but are undesirable for several reasons. One conventional repair method includes brazing the engine component to repair the microcracks. Typically, brazing includes heating the engine component or a relatively large zone of the engine component at high temperatures to melt a braze filler to fill the microcracks. The high temperatures may result in undesirable residual thermal stress in the engine component and undesirable changes in the metallic microstructure of the repaired areas.

Accordingly, there is a need for a method of repairing a turbine airfoil along a chordwidth dimension to restore the airfoil to an original shape and prolong the useful life of the turbine airfoil without inducing high levels of residual stress.

SUMMARY OF THE INVENTION

A method of restoring gas turbine engine component according to the present invention includes repairing a turbine airfoil along a chordwidth dimension to refurbish an eroded chordwidth dimension to a restored chordwidth dimension. This includes a step of removing an eroded portion of a trailing edge of the turbine airfoil and depositing a laser cladding to rebuild the shape of the trailing edge.

In one exemplary method, the turbine airfoil includes a slot that extends through the trailing edge of the turbine airfoil. A barrier member is inserted into the slot during the laser cladding process to prevent laser cladding filler material from entering into the slot. The filler material is deposited next to the barrier member to reform a portion of the slot. During the laser cladding process, the barrier member also acts as a heat sink to remove heat from the rebuilt trailing edge of the turbine airfoil and minimize heat affected area.

Accordingly, the disclosed example provides a method of refurbishing a trailing edge of a turbine airfoil to near the original chordwidth dimensions to recover aerodynamic efficiency.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 shows an example cross-section of a turbine vane having a leading edge and a trailing edge.

FIG. 3 shows an eroded surface and an original surface of the trailing edge of the vane of FIG. 2.

FIG. 4 shows removal of the eroded portion of the vane of FIG. 3 and insertion of a barrier member into a slot through the trailing edge.

FIG. 5 shows rebuilding the trailing edge to produce an oversized cladded portion that is then machined down to produce a restored trailing edge having a chordwidth dimension near an original chordwidth dimension of the vane.

DETAILED DESCRIPTION OF THE PREFERRED EMBODIMENT

Figure 1:
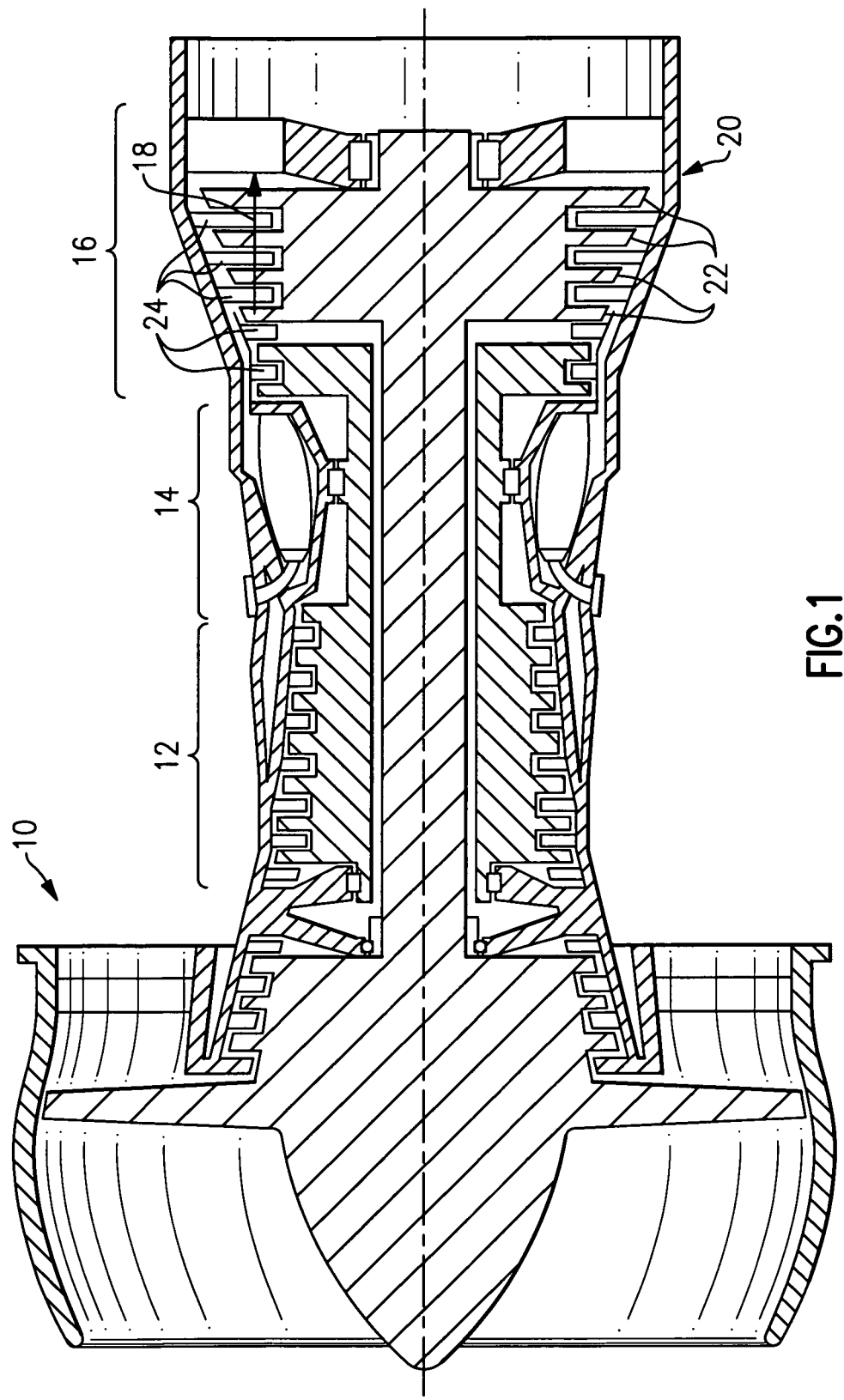
FIG. 1 shows an example combustion engine.

FIG. 1 illustrates selected portions of an example combustion engine 10, such as a gas turbine engine for an aircraft. In this example, the combustion engine 10 includes a compressor section 12, a combustor section 14, and a turbine section 16. The combustion engine 10 operates in a known manner, feeding compressed air or oxidizer from the compressor section 12 to the combustor section 14. The compressed air or oxidizer is mixed with fuel and reacts to produce a flow of hot gases 18. The turbine section 16 transforms the flow of hot gases 18 into mechanical energy to drive the compressor section 12. An exhaust nozzle 20 directs the hot gases 18 out of the combustion engine 10 to provide thrust to the aircraft or other vehicle.

In the illustrated example, the turbine section 16 includes alternating rows of rotary airfoils or blades 22 and static airfoils or vanes 24. The vanes 24 are arranged in various stages, such a first stage, a second stage, a third stage, a fourth stage, etc. The blades 22 and vanes 24 are formed from a superalloy metal material, such as a cobalt or nickel superalloy in a casting, forging, or other known manufacturing process.

Referring to the vane 24 cross section shown in FIG. 2, the vane 24 includes a leading edge 36 and a trailing edge 38. The leading edge 36 is generally located toward the combustor section 14 and the trailing edge 38 is generally located toward the exhaust nozzle 20 in the combustion engine 10 (FIG. 1).

The leading edge 36 and the trailing edge 38 define a chordwidth 40 of the vane 24. A thickness dimension 42 is transverse to the chordwidth 40. In the illustrated example, an aspect ratio of the chordwidth 40 to the thickness 42 at least partially determines an aerodynamic efficiency of the vane 24. That is, a relatively larger aspect ratio corresponds to a greater aerodynamic efficiency, while a relatively smaller aspect ratio corresponds to a lesser aerodynamic efficiency.

The vane 24 includes an internal cavity 44 that extends towards the trailing edge 38 to define a slot 46. The slot 46 opens through the trailing edge 38. Pedestals 48 within the turbine vane 24 support a suction side 50 and a pressure side 52 of a vane 24. The internal cavity 44 and slot 46 reduce the weight of the vane 24 and allow internal cooling of the vane 24.

FIG. 3 shows a more detailed view of the section shown in FIG. 2. In the illustrated example, the dotted line 54 represents an eroded surface of the trailing edge 38. In one example, the eroded surface 54 is the result of field operation of the combustion engine 10. A solid line 56 represents an original surface of the trailing edge 38. The original surface 56 refers to a shape and dimension of the trailing edge 38 before erosion. Thus, the original surface 56 may be the as-cast or as-forged condition of the trailing edge 38 of a newly manufactured vane 24. Alternatively, the original surface 56 is the as-designed dimension of the trailing edge 38 as found in a combustion engine 10 design manual.

Over time, the friction of hot gases 18 from the combustor section 14, soot, or particles in the hot gas flow 18 erode away the original surface 56 to produce the eroded surface 54. The erosion reduces the chordwidth 40 dimension by an amount 58, which reduces the aerodynamic efficiency of the vane 24 as described above.

Referring to FIG. 4, to repair the eroded surface 54 and restore the original chordwidth 40, a portion 55 of the trailing edge 38 is removed by machining, grinding, grit blasting, or other known removal method. In the illustrated example, the portion 55 is removed to produce a relatively flat surface 70, which will serve as a substrate surface for depositing a laser cladding portion to rebuild the trailing edge 38 as described below.

After removal of the portion 55, a laser cladding is deposited onto the relatively flat surface 70 to rebuild the trailing edge 38. Before laser cladding, a copper barrier member 72 is inserted into the slot 46 of the trailing edge 38. The copper barrier member 72 prevents filler material 74 (FIG. 5) that is used to rebuild the trailing edge 38 during the laser cladding process from entering the slot 46. This provides the benefit of eliminating the need for machining the slot 46 after the laser cladding process to restore the slot 46 shape.

Additionally, the copper barrier member 72 serves as a heat sink to remove heat (as indicated by the arrows 73) from the trailing edge 38 during the laser cladding process. The removal of heat through the copper barrier member 72 minimizes the size of the heat affected zone of the trailing edge 38 and thus reduces heat distortion, which is a problem with prior art welding and brazing methods.

Referring to FIG. 5, the filler material 74 is deposited onto the flat surface 70 in a known manner as a powder or other type of filler material to gradually build-up the trailing edge 38. In one example, the filler material is of a similar composition to the superalloy used to originally form the vane 24 to promote a strong bond between the cladding and the original superalloy of the vane 24. In another example, the filler material is a composition according to the standard set forth in AMS 5837.

A laser consolidates (i.e., melts and fuses) the deposited filler material 74 in a known manner. The melting and fusing of the filler material 74 is relatively rapid and accurate, which provides the benefit of a fast vane 24 repair cycle time and a high degree of repeatability. Furthermore, laser cladding melts and fuses a relatively small trailing edge 38 and filler material 74 volume to minimize the size of the heat affected zone of the trailing edge, which is a drawback of prior art brazing and welding that result in relatively large heat affected zones.

The consolidated filler material 74 builds-up on the trailing edge 38 to form an oversized cladded portion 76 that is bonded to the original superalloy material at the flat surface 70 of the vane 24. The oversized cladded portion 76 is larger than the original surface 56 in the chordwidth 40 dimension by an amount 78. This provides the benefit of ensuring that trailing edge 38 is built-up enough to completely restore the chordwidth 40 dimension to the original airfoil shape.

After the oversized cladded portion 76 is deposited on the trailing edge 38, the copper bearing member 72 is removed from the trailing edge 38. Next, the oversized cladded portion 76 is machined to the chordwidth 40 dimension of the original surface 56. In one example, the machining includes known grinding, grit blasting, polishing, or other known machining method that provides a smooth transition area from the laser cladding to the original, non-repaired portions of the vane 24.

The above example discloses a method for restoring the vane 24, or other turbine component. The trailing edge 38 of the vane 24 is eroded away during operation of the combustion engine 10, which reduces the aerodynamic efficiency of the turbine vane 24. The eroded portion of the trailing edge 38 is then removed and laser cladding is used to rebuild the trailing edge 38. Thus, the chordwidth dimension 40 of the vane 24 is restored to near its original dimension to increase the aerodynamic efficiency of the vane 24 and extend the life of the vane 24.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of restoring a gas turbine engine component, including the step of:
   (a) providing a turbine airfoil for repair along a chordwidth dimension to refurbish an eroded chordwidth dimension to a restored chordwidth dimension
   (b) inserting a barrier member into a slot in a trailing edge of the turbine airfoil to prevent a filler material from entering the slot, wherein a first portion of the barrier member extends past the eroded chordwidth dimension and into a portion of the slot defined by an original component, wherein a second portion of the barrier member protrudes beyond the trailing edge of the turbine airfoil;
   (c) depositing the filler material adjacent the barrier member to extend a slot length of the slot, wherein the filler material is the same material as the original component; and
   (d) laser cladding the trailing edge of the turbine airfoil along the chordwidth dimension with the filler material to form a cladded portion defining a restored portion of the trailing edge, wherein the cladded portion is disposed around the barrier member, wherein the second portion of the barrier member protrudes substantially in the chordwidth dimension beyond the cladded portion after the laser cladding.

2. The method of claim 1, further including the step of removing heat from the trailing edge through the barrier member.

3. The method of claim 1, further including the step of machining the trailing edge to form a substantially flat cladding surface before depositing the filler material.

4. The method of claim 1, wherein step (d) includes depositing the filler material to produce an oversized chordwidth dimension that is greater than the restored chordwidth dimension.

5. The method of claim 4, wherein step (d) includes machining the oversized chordwidth dimension to produce the restored chordwidth dimension.

6. The method of claim 1, wherein the restored chordwidth dimension of step (a) is approximately an original chordwidth dimension of the turbine airfoil.

7. The method of claim 1, wherein the barrier member is copper.

8. The method of claim 1, wherein the barrier member is a heat sink.

9. The method of claim 1, wherein the filler material is a superalloy.

10. The method of claim 1, wherein the filler material of step (c) is bonded to the original component.

11. The method of claim 10, including the step of removing the barrier member from the turbine airfoil such that the slot length extends through the filler material.

12. The method of claim 1, wherein the slot defines a suction trailing edge side and a pressure trailing edge side opposite said suction trailing edge side, wherein step (a) includes a first laser cladding portion on said suction trailing edge side and a second laser cladding portion on said pressure trailing edge side.

13. The method of claim 1, wherein the second portion of the barrier member protrudes beyond the filler material after completion of the step (c).

14. The method of claim 1, including the step of machining the eroded chordwidth dimension to produce a relatively flat surface, wherein the filler material is deposited on the relatively flat surface.

15. The method of claim 1, wherein the second portion is arranged relative to the trailing edge to transfer heat away from the trailing edge.

16. The method of claim 1, including the step of removing the barrier member from the turbine airfoil such that the slot length extends to an outer side of the restored portion of the trailing edge defined by the cladded portion.

* * * * *

UNITED STATES PATENT AND TRADEMARK OFFICE
CERTIFICATE OF CORRECTION

Page 1 of 1

PATENT NO. : 9,017,024 B2
APPLICATION NO. : 11/388084
DATED : April 28, 2015
INVENTOR(S) : Kenny Cheng It is certified that error appears in the above-identified patent and that said Letters Patent is hereby corrected as shown below:

IN THE CLAIMS:

In claim 4, column 5, line 1; delete "(d)" and replace with --(c)--

Signed and Sealed this
Eighth Day of September, 2015

Michelle K. Lee
*Director of the United States Patent and Trademark Office*